US006628286B1

(12) United States Patent
Comair et al.

(10) Patent No.: US 6,628,286 B1
(45) Date of Patent: Sep. 30, 2003

(54) METHOD AND APPARATUS FOR INSERTING EXTERNAL TRANSFORMATIONS INTO COMPUTER ANIMATIONS

(75) Inventors: Claude Comair, Vancouver (CA); Prasanna Ghali, Vancouver (CA); Samir Abou Samra, Vancouver (CA); Sun Tjen Fam, Vancouver (CA); Xin Li, Issaquah, WA (US)

(73) Assignee: Nintendo Software Technology Corporation, Redmond, WA (US)

( * ) Notice: Subject to any disclaimer, the term of this patent is extended or adjusted under 35 U.S.C. 154(b) by 0 days.

(21) Appl. No.: 09/414,883

(22) Filed: Oct. 8, 1999

(51) Int. Cl.$^7$ .............................................. G06T 15/70
(52) U.S. Cl. ........................ 345/473; 345/427; 345/619
(58) Field of Search .................................. 345/473, 474, 345/418, 419, 433, 427, 619

(56) References Cited

U.S. PATENT DOCUMENTS

| | | | | |
|---|---|---|---|---|
| 4,600,919 A | * | 7/1986 | Stern ........................... | 345/475 |
| 4,797,836 A | * | 1/1989 | Witek et al. ................. | 364/518 |
| 5,261,041 A | | 11/1993 | Susman | |
| 6,088,042 A | * | 7/2000 | Handelman et al. ......... | 345/473 |
| 6,166,746 A | * | 12/2000 | Inada et al. .................. | 345/474 |

OTHER PUBLICATIONS

Do–While Jones, "Quaternions quickly transform coordinates without error buildup," *EDN Magazine* (Mar. 2, 1995).
Teven, Dan, "Product Review, Motivate 1.1: It's About Character," *Game Developer*, 6 pages, Aug. 1998.
"Motivate 3D Game Development System," The Motion Factory Inc., 2 pages, 1999.
"Motivate Seminars at E3!" The Motion Factory, Inc., 1 page, undated.
Video, "The Motion Factory, Motivate–Intelligent Digital Actor System," (1997).
Epstein, Samuel Latt, "CAT–Collaborative Authoring Tool," *The SenseMedia Papers*, Sep. 15, 1996, 6 pages.
Funge, John, "Making Them Behave, Cognitive Models for Computer Animation," a Ph.D. thesis, University of Toronto, 121 pages, 1998.
Funge, John et al., "Making Them Behave," 21 slides, www.cs.toronto.edu, undated.
Funge, John et al., "Making Them Behave," 1 page, undated.
Funge, John , "Cognitive Modeling for Computer Games and Animation," Microcomputer Research Lab, Intel Corporation, 2 pages, undated.
Funge, John, "Hardcore AI for the Computer Games of Tomorrow," Microcomputer Research Lab, Intel Corporation, Class # 4044, 6 pages.

* cited by examiner

*Primary Examiner*—Mark Zimmerman
*Assistant Examiner*—Kimbinh T. Nguyen
(74) *Attorney, Agent, or Firm*—Nixon & Vanderhye P.C.

(57) ABSTRACT

Transformation matrices describing the motion of an articulated reference object specify translations of the reference object and/or its articulated parts, and are relative to the origin of the object's coordinate system. During the real-time animation process, a connection matrix is saved to represent the current transformation status of the animated object. This connection matrix being obtained by continuously concatenating an external transformation (if any) with the next animation step. This process allows efficient insertion of external transformations (e.g., resulting from operating real-time interactive user controls). Use of absolute transformations to develop the connection matrix allows a first animation sequence to be interrupted at any arbitrary point and immediately, smoothly followed by a second animation sequence (e.g., walking can be interrupted at any time and turned into running, jumping, etc.).

26 Claims, 15 Drawing Sheets

Fig. 1A *(PRIOR ART)*
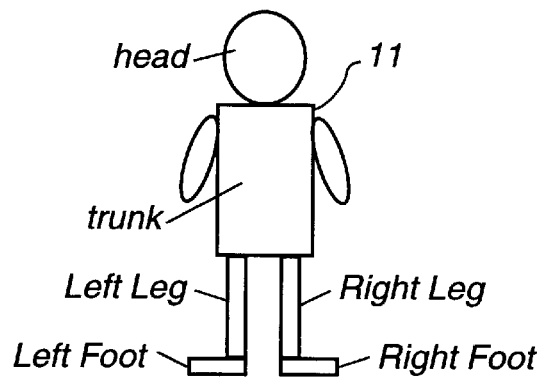
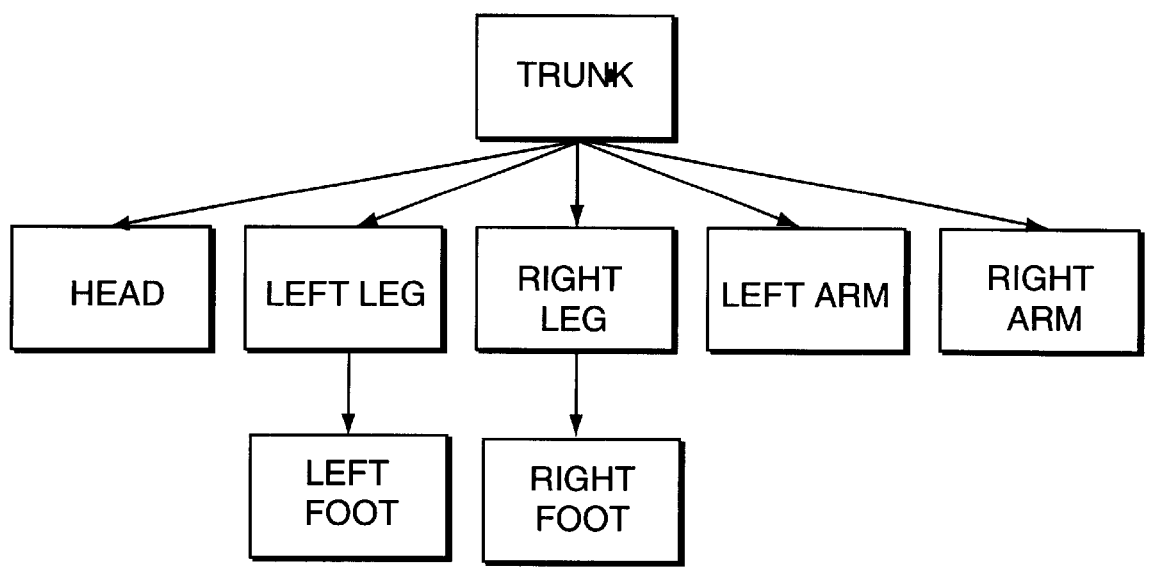
Fig. 1B *(PRIOR ART)*

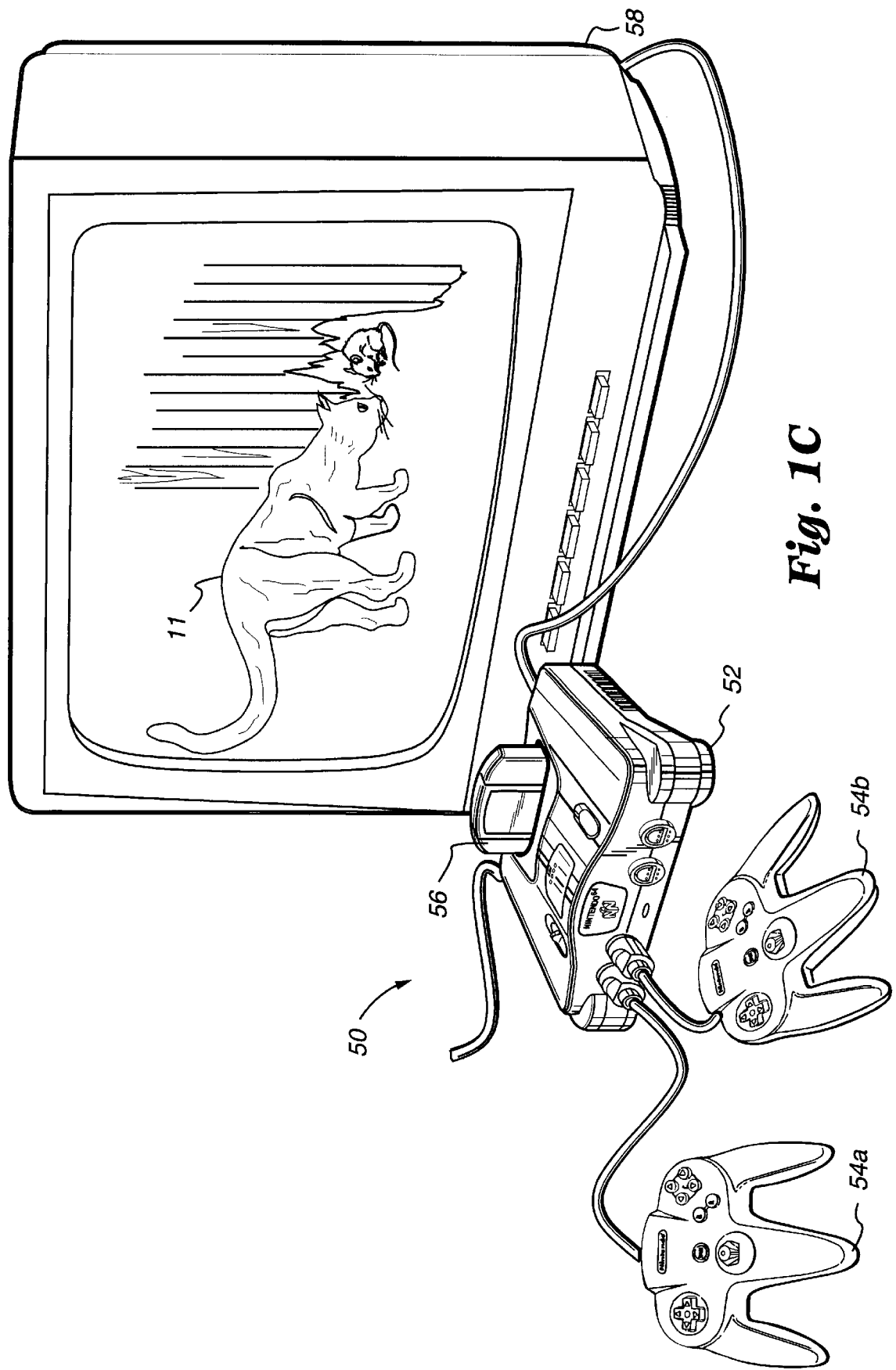

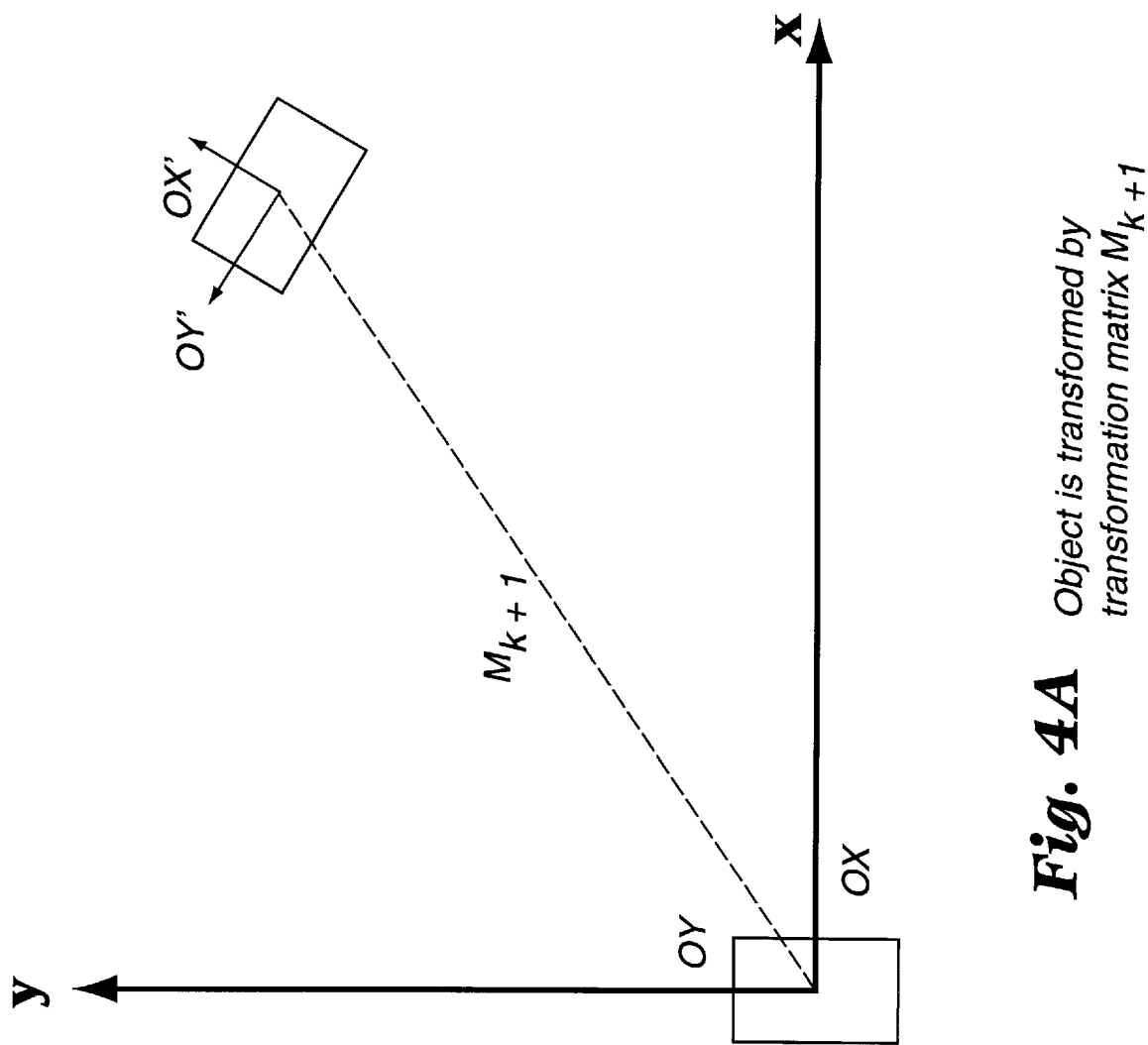
Fig. 4A Object is transformed by transformation matrix $M_{k+1}$

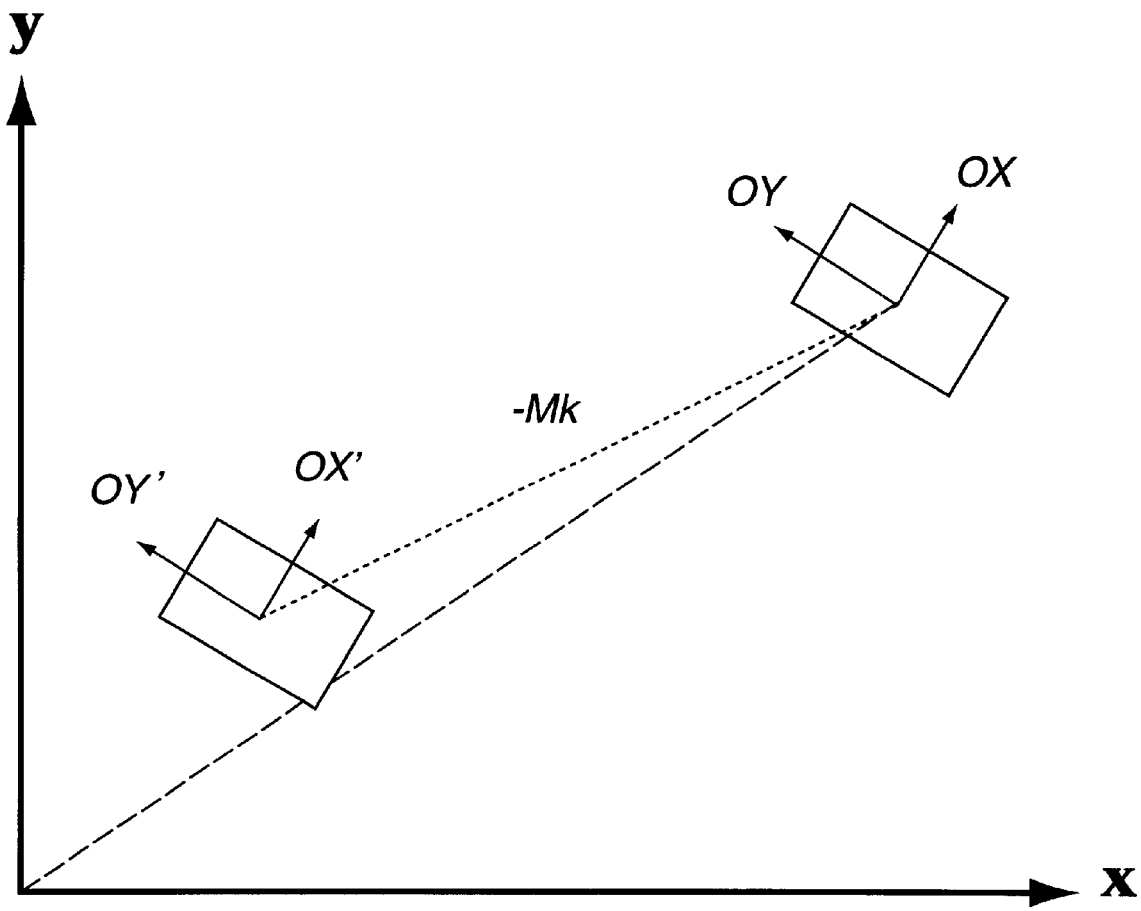
*Fig. 4B*    Object is translated by translation matrix $-M_k$

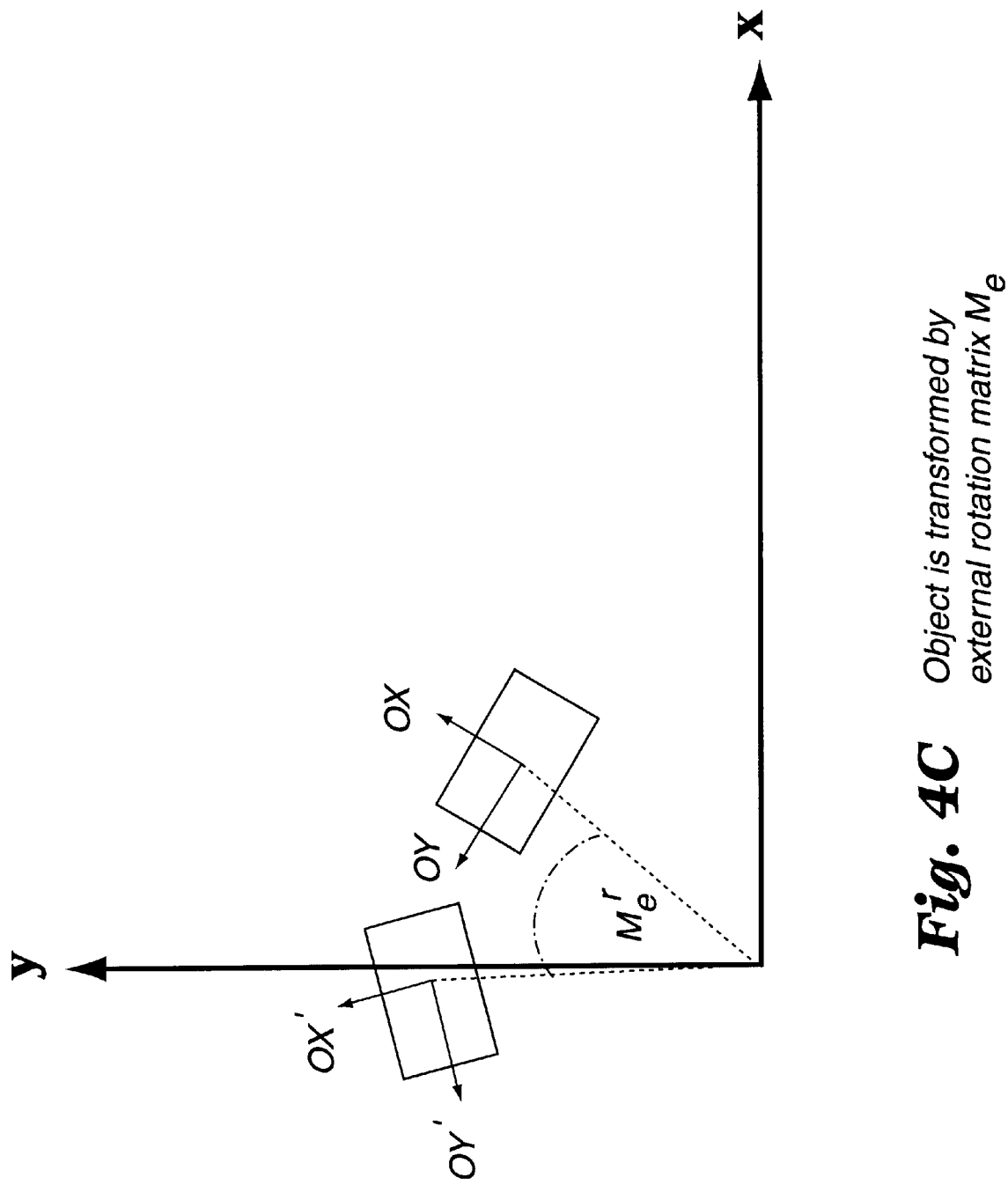
Fig. 4C  Object is transformed by external rotation matrix $M_e$

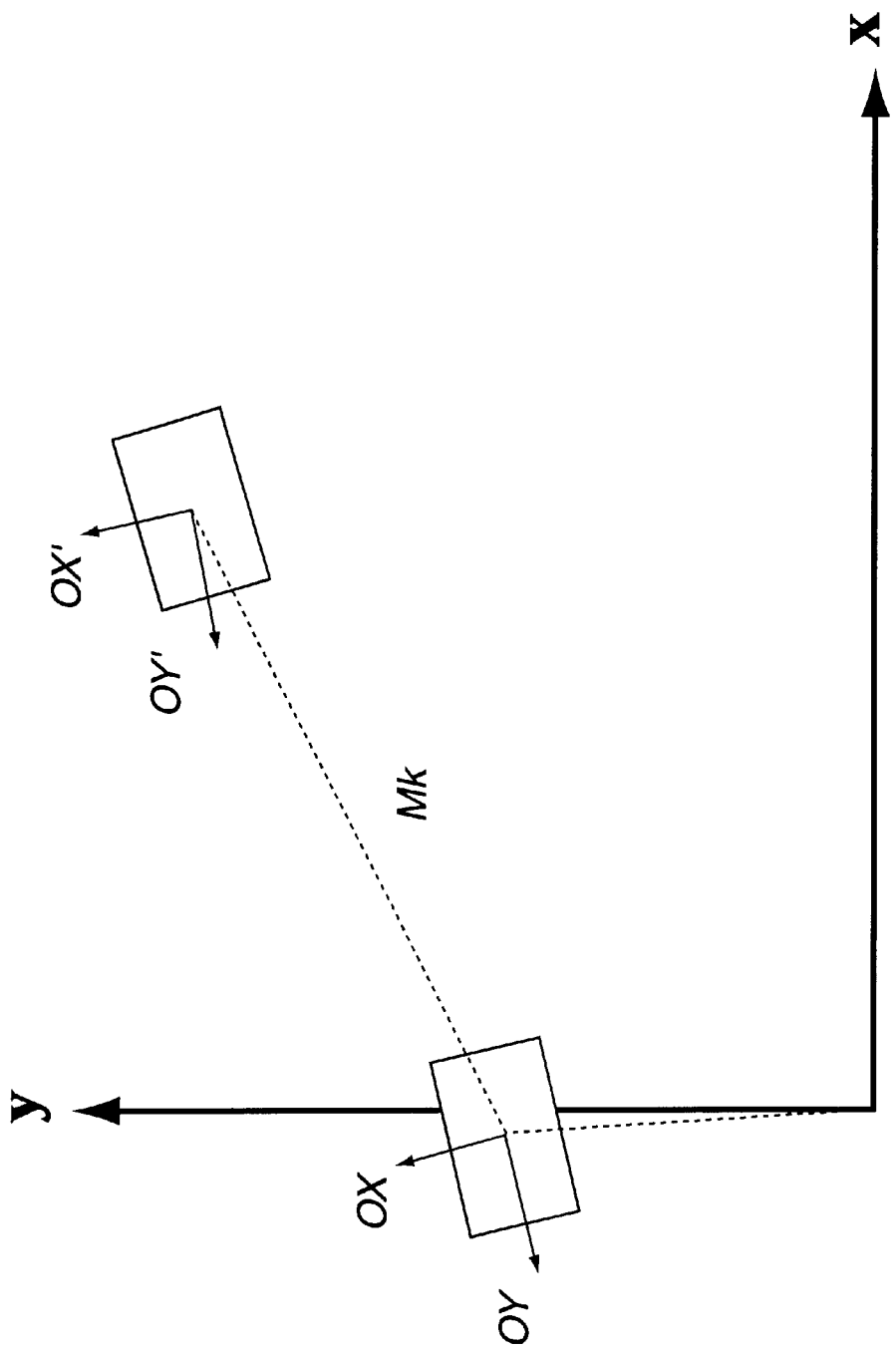
Fig. 4D  Object is translated by translation matrix $M_k$

METHOD AND APPARATUS FOR INSERTING EXTERNAL TRANSFORMATIONS INTO COMPUTER ANIMATIONS

FIELD OF THE INVENTION

This invention relates to the field of computer graphics, and more specifically, to modeling and/or simulating the behavior and motion of real-world articulated objects such as humans, animals and birds in real-time 3-dimensional video games and other interactive contexts. Still more particularly, this invention relates to a unique solution to the problem of efficiently inserting external matrix transformations (e.g., generated in real time) to computer-modeled animations and/or changing animation sequences at an arbitrary point.

BACKGROUND AND SUMMARY OF THE INVENTION

Computers and video games have revolutionized animation—the process of showing a sequence of images in rapid succession to create the illusion of motion.

In the past, animations were created by a human artist drawing each of the many still frames required (e.g., over 1000 frames for each minute of animation). Now computers can do most of this work.

For example, computers are commonly used to automatically generate an arbitrarily-long sequence of successive incremental frames between two "key frames" specified by the animation artist or captured by an image sensing device. Using this technique, a first frame and a last frame of an animation sequence are specified, along with the duration of the sequence. Based on this information, the computer automatically generates the many intermediate frames between the first and last frames using a process called interpolation. FIG. 1 illustrates this well known technique. In the FIG. 1 example, the animation artist specifies a first key frame 10 in which the arm of character 11 is lowered, and a second key frame 12 in which character 11's arm is raised. The computer interpolates to automatically generate intermediate frames 14(1), 14(2), 14(3), ..., 14(N), showing character 11's arm in the various intermediate positions between the lowered and raised positions.

Pre-storing each still picture in its entirety would take up too much space. Therefore, the computer uses a sequence of mathematical transformations to specify incremental changes between the successive frames of the animation. These mathematical transformations can be conveniently represented by a mathematical construct called a transformation matrix ("M") that specifies the amount of translation, rotation and scaling in each of the three possible axes (x, y, z) of three-dimensional space. Such transformation matrices are commonly used in computer graphics to represent changes in position, orientation and/or size between successive images.

FIG. 1 shows how a first transformation matrix M 16(1) transforms the beginning key frame 10 to a first intermediate frame 14(1); a second transformation matrix M 16(2) transforms the first intermediate frame 14(1) to a second intermediate frame 14(2); and so on, with a last transformation matrix M 16(N) transforming the last interpolated intermediate frame 14(N-1) to the second key frame 12.

In this example, the computer models character 11 just as real humans or animals are constructed—out of different parts (e.g., legs, arms and a torso) interconnected by articulated joints. See FIG. 1A. This modelling technique allows the computer to break up the animation problem into more easily handled parts (for example, how the character's right arm moves relative to the character's torso; and how the character's torso moves relative to the character's surroundings). Dividing a character 11 up into different articulated portions allows the computer to use different transformation matrices to move parts of the character relative to other parts of the character. For example, one transformation matrix may be applicable to the entire character (e.g., to move the entire character relative to a common three-dimensional "world" space). Other matrices may apply to various body parts of the character. Such articulated portions are sometimes represented in a hierarchical structure an example of which shown in FIG. 1B. To move a part of the character relative to the rest of the character (e.g., to cause the character to raise its arm), a transformation matrix is applied to that part of the character relative to the rest of the character.

Because the animation must run at high speed (i.e., over a thousand pictures a minute) to create the illusion of fluid motion, it is desirable to pre-compute and pre-store the necessary animation transformation matrices when the animation sequence is authored. Then, during video game play or other presentation of the animation, the computer reads these pre-stored matrices and applies them to achieve a desired visual animation effect.

However, in an interactive situation like a video game, how a character moves and how a scene changes may depend in part on events occurring in real time (for example, a game player's operation of joysticks, buttons or other controls). This means that the real time interactive animation or simulation cannot rely entirely on pre-computed animation matrices, but must instead provide some way for the animation to also be affected by real world inputs. For example, while a character's arm and leg motion may be characteristic of the particular character and may be essentially the same irrespective of the direction in which the character walks, the direction in which the character walks may be controlled by operation of a keyboard, handheld controller or joystick.

While it would be desirable to use the same pre-computed animation (matrix) sequences for any arbitrary walking direction, this has sometimes been difficult to achieve in the past because of the way the animation transformation matrices are typically pre-computed as representing the incremental change(s) (Δ) between successive frames of the animation. This has in some cases meant that the animation artist at authoring time must anticipate each of the various directions the character will be required to walk, and pre-compute a different animation sequence for each different direction. For example, one technique pre-computes a walking animation sequence for each 10 degrees of the compass—allowing a character to walk in any selectable one of thirty-six different directions. Storing all of these various pre-computed sequences takes up a lot of space in memory, and also does not actually cover every possible walking direction (for example, in this scenario, the video game player cannot control the character to walk in a direction of 245 degrees, but is limited to 240 degrees or 250 degrees). It would be desirable to easily and efficiently insert, into a pre-computed animation sequence, an arbitrary external transformation generated in real time response to user interaction in order to, for example, control the character's orientation and/or translation direction and speed.

Another problem relating to pre-constructed animation matrices for real time interactive animations is how to handle a transition from one animation sequence to another. Past techniques defining each incremental frame of an animation sequence relative to the last frame of the sequence can lead to unnatural-looking transitions between different animation sequences. Suppose for example that during an interactive game, the game player operates a hand controller to cause character 11 to walk for a time and then suddenly pushes a button to cause the character to run. In many prior systems, it was necessary to finish the walking animation sequence before starting the running animation sequence. This is why some prior games noticeably delay transitions between different animation sequences. One approach to solving this problem is to make each animation sequence very short so the player won't notice any significant delay. In contrast, however, a real world person or animal can immediately change direction or orientation without waiting for a prior motion to complete. It would be desirable to simulate such fluid continuity by allowing an immediate transition from any arbitrary frame of an animation sequence to another animation sequence.

The present invention solves these problems by providing a unique framework for allowing an externally-supplied transformation matrix to further transform an ongoing animation, and for smoothly concatenating animations together seamlessly and arbitrarily. The algorithm can be built in a game-authoring environment that allows artists, musicians and developers to maximize their creative freedom and reduce engineering costs. Techniques provided in accordance with the present invention can be used in the context of a hierarchical articulated system, to efficiently provide lifelike and natural motion of a variety a complex humanoid, animal and other simulated animated objects.

In accordance with one aspect of this invention, a reference object is defined as the root of the articulated system. Transformation matrices describing the motion of this reference object are constrained to translations. This means the matrices can be easily inverted. The ability to easily invert theses matrices avoids the cost of computing, at run time, a "relative" matrix representing change relative to the last transformation.

In accordance with another aspect of this invention, a sequence of transformation matrices defines an animation sequence for an articulated part of the reference object. This sequence of transformation matrices is constructed as absolute transformations. That is, the translations described by the transformation matrices are not relative to the previous position of the articulated system, but instead are defined with respect to the origin of the object's coordinate system. Because each animation step references the origin (as opposed to a "last" position), each step is essentially self-contained—and can thus serve as the departure point for any other arbitrary transformation (e.g., the first step of a different animation sequence).

In accordance with a further aspect of the invention, a connection matrix is saved at each animation step to represent the current transformation status of the animated object. This connection matrix embodies the result of the entire history of all previous transformations on the object. This connection matrix is obtained at each animation step by continuously concatenating an external matrix, if any, with the transformation matrix for the animation step. The historical information the connection matrix stores is used to further transform the animation, and is also stored for use in the next successive animation step(s).

Although the transformations performed in accordance with the present invention can be implemented by multiplying the various matrices together to achieve a single transformation matrix which is then applied to the object, one way to think about the transformation process in accordance with one embodiment of the present invention is as follows:

the object is transformed by the inverse translation of the current animation step;

the external transformation (if any) is inserted (e.g., based on real time input);

the object is (re)translated based on the current animation step's translation matrix;

the connection matrix saved from the last animation step is used to concatenate with above transformation with matrix; and the next animation step's transformation matrix is applied to obtain the object's new location and orientation.

Because these techniques relate the object back to its reference coordinate system origin, they can be efficiently used at any arbitrary point in an animation sequence. This allows any arbitrary frame of an animation sequence to be a departure point for a different animation sequence. Furthermore, because the transformation matrices are defined as absolute translations, the transformation calculations are very efficient (for example, perhaps ten times faster than otherwise in some contexts); and provide a very high degree of natural realism and fluid motion. As one dramatic example, a character that is animated in accordance with the present invention can efficiently and rapidly shift from doing backward handstands to doing forward handstands in a very realistic and fluid manner without interruptions. Furthermore, the calculations provided by the present invention are very inexpensive from a computational standpoint, and are therefore particularly suited for high-speed execution on restricted- resource graphics platforms such as 3D home video game consoles. Such efficiencies also help provide quick prototyping of newly authored animations.

The present invention thus allows an artist to choose a single translation direction (e.g., the most convenient one to model) relative to a reference origin, for authoring a particular animation. The direction of translation and the orientation of the object being animated can be easily and efficiently changed at run-time to any arbitrary orientation and/or translation direction, based on insertion of an external transformation matrix. Furthermore, a connection matrix continuously concatenated with the animation sequence animation matrices can be used to supply a different object location (e.g., based on the object's prior history in the 3D universe). Still further, the artist may author an animation sequence having any arbitrary duration, since the sequence can be efficiently interrupted at any time in the real-time animation process to bridge into a different animation sequence. These added flexibilities make it possible for a graphics artist without much or any programming experience to easily author extremely realistic and fluid animations.

BRIEF DESCRIPTION OF THE DRAWINGS

These and other features and advantages of the present invention will be better and more completely understood by referring to the following detailed description of presently preferred example embodiments in conjunction with the drawings, of which:

FIG. 1A shows an example prior art hierarchical articulated character model;

FIG. 1B is a schematic illustration of an example prior art database representation of the FIG. 1A hierarchical model;

FIG. 1C is an example 3D graphics display system the preferred embodiment of the present invention can use to present animations on;

FIGS. 4A–4D schematically illustrate a step-by-step explanation of the FIG. 4 process;

DETAILED DESCRIPTION OF PRESENTLY PREFERRED EXAMPLE EMBODIMENTS

Figure 1:
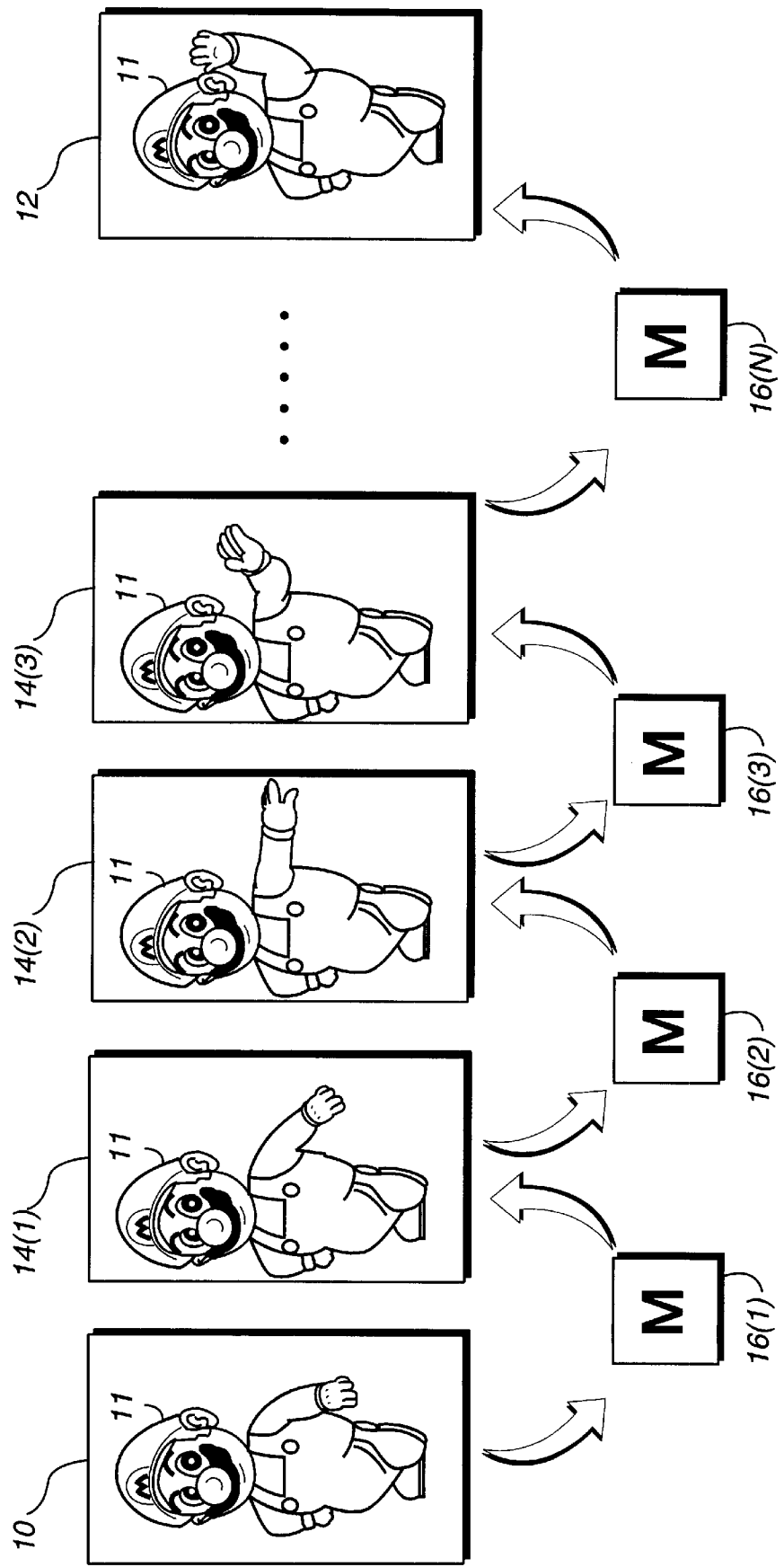
FIG. 1 shows an example prior art "key frame" animation technique.

FIG. 1C shows an example 3-D real time computer animation system 50 that may be used to provide realistic interactive real time 3D simulation and animation in accordance with the present invention. The FIG. 1 example system 50 includes a NINTENDO 64® 3-D video game console 52 and associated hand controllers 54a, 54b. A cartridge 56, optical disk or other storage medium storing a software animation (video game) program is operatively connected to console 52. The console 52 is connected to a display device 58 such as a conventional home color television set or computer monitor. Console 52 includes a 3D graphics engine that can render 3D animation on display 58 in real time response to user manipulation of controllers 54a, 54b. The software within cartridge 56 controls console 52 to display a sequence of animated video frames on display 58. These animated video frames can serve to animate an arbitrary three-dimensional character 11 such as the character schematically shown in FIG. 2.

Figure 2:
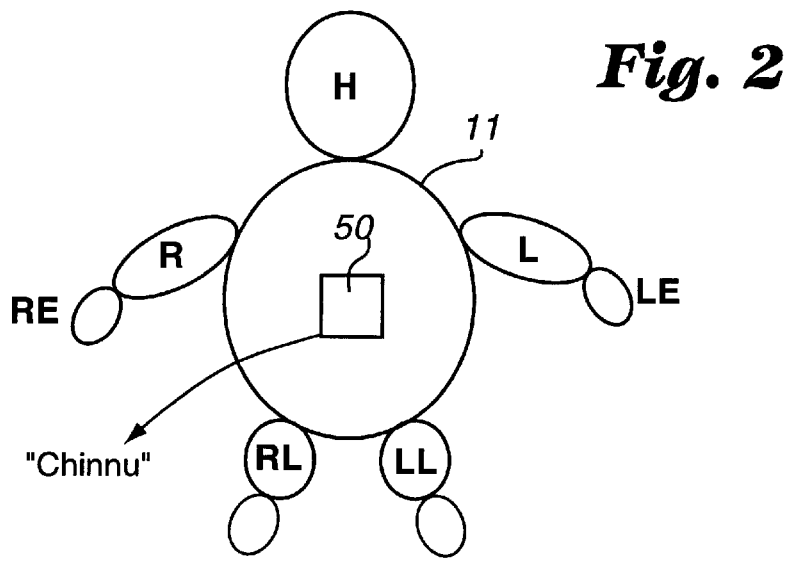
FIG. 2 schematically illustrates a reference object in accordance with the present invention.

FIG. 2 shows definition of a reference object 50 with respect to arbitrary three-dimensional character 11. The reference object 50 (which may be a cube) is defined at the root of the hierarchical articulated system used to represent character 11 (see FIGS. 1B, 6A & 6B for example).

In accordance with one aspect of the present invention, all transformation matrices describing the motion of reference object 50 are constrained to translations only. Thus, these various translations will result in translating the reference object 50 along a piecewise-linear path. Those skilled in the art will recognize that this form of transformation matrix is relatively easy to invert (e.g., using only three additions)— making the inversion process computationally inexpensive and very efficient.

In accordance with another aspect provided by the invention, the transformation matrices defining animations are constructed as absolute transformations. That is, the transformations described by the transformation matrices are not relative to the previous position of the articulated system (e.g., a "Δ" between successive displayed frames), but instead are defined with respect to the origin of the object's coordinate system. Because these matrices are defined with respect to the origin of modeling space for the object, the transformation matrices applied to each animation step all relate back to a common reference origin. One implication of this technique is that any arbitrary animation transformation can follow any other animation transformation. This gives the animation system a much more lifelike and realistic appearance, allowing characters for example to change from a walk to a run or vice versa within the time of a single animation frame.

Figure 2A:
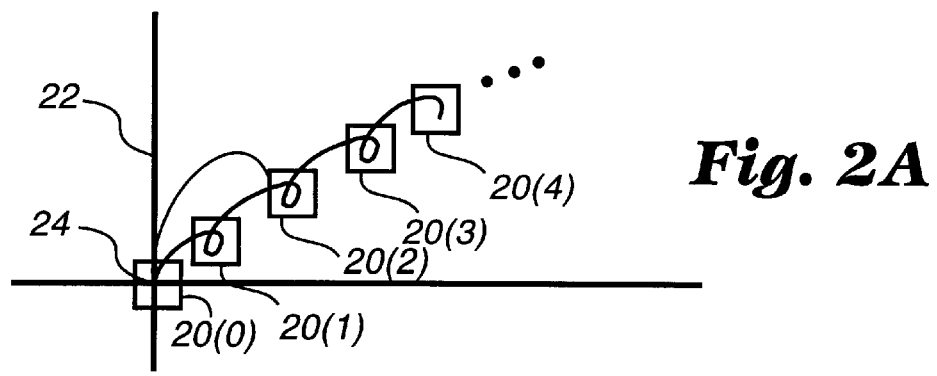
FIG. 2A schematically shows successive transformations of the FIG. 2 reference object for sequential animation frames.
Figure 2B:
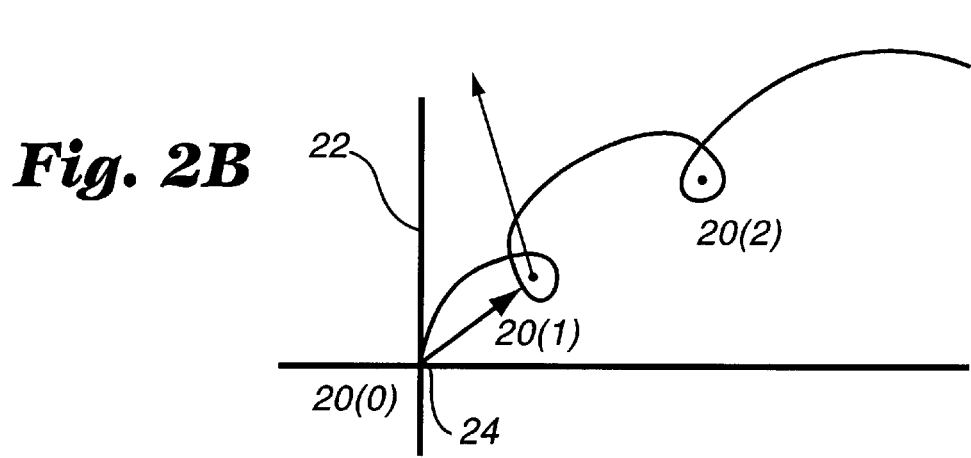
FIGS. 2B and 2C illustrate examples of how any arbitrary animation frame can be a departure for a new animation sequence.
Figure 2C:
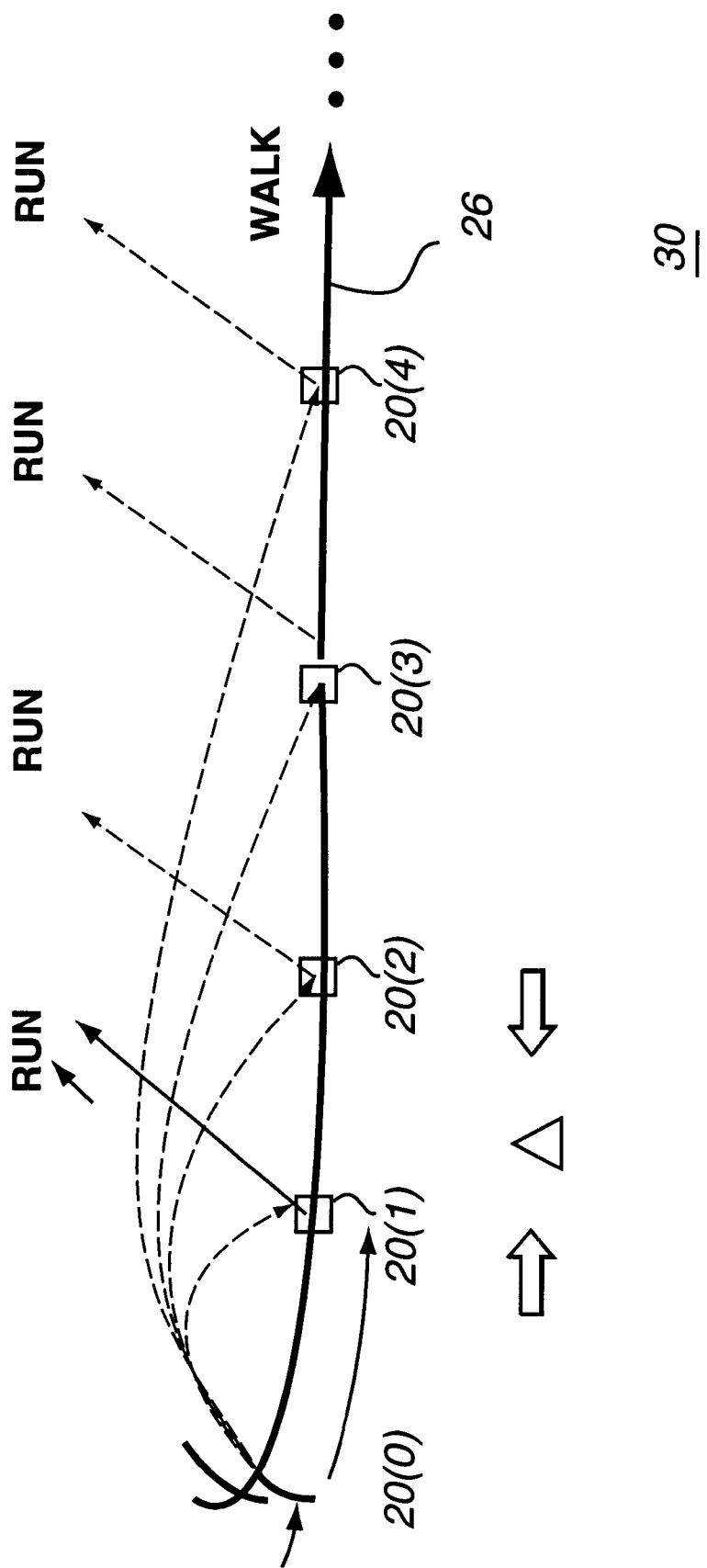

FIGS. 2A, 2B and 2C illustrate some the advantages provided by using such absolute transformation matrices. FIG. 2A shows an example animation sequence comprising animation step transformations 20(0), 20(1), 20(2), 20(3), 20(4), relative to the modeling coordinate system origin 22. For purposes of simplified illustration, FIGS. 2A and 2B show the modeling coordinate system as two-dimensional, but those skilled in the art will understand that in a 3-D graphics system this coordinate system will have another axis to make it be three-dimensional rather than two-dimensional.

Each of the various translation transformations of FIG. 2A independently relates back to and references the modeling coordinate system origin 24. The corollary of this construct is that each transformation describes the current position of the reference object 50 without reference to any prior transformation. This powerful construct allows any transformation to be a departure point for any other transformation (e.g., to change to direction of character motion, or even to being a completely different animation sequence).

FIG. 2C graphically illustrates this. Suppose axis 26 of FIG. 2C represents, in linear form, an animation path defined by the first few frames 20(0), 20(1), . . . of an example "walk" animation sequence. FIG. 2C shows that any of these frames can be a departure point for an entirely different animation sequence (e.g., a "run" animation sequence). Because each of the transformations in the FIG. 2C "walk" animation sequence is absolute (i.e. in accordance with present invention, each change in position (Δ) relative to the last animation frame is represented relative to the object's reference coordinate system origin instead of with respect to the last frame position), it becomes very easy and efficient to "interrupt" one animation sequence at any point in the sequence to begin a different animation sequence.

EXAMPLE COMPUTER PROCESSING STEPS

Figure 3:
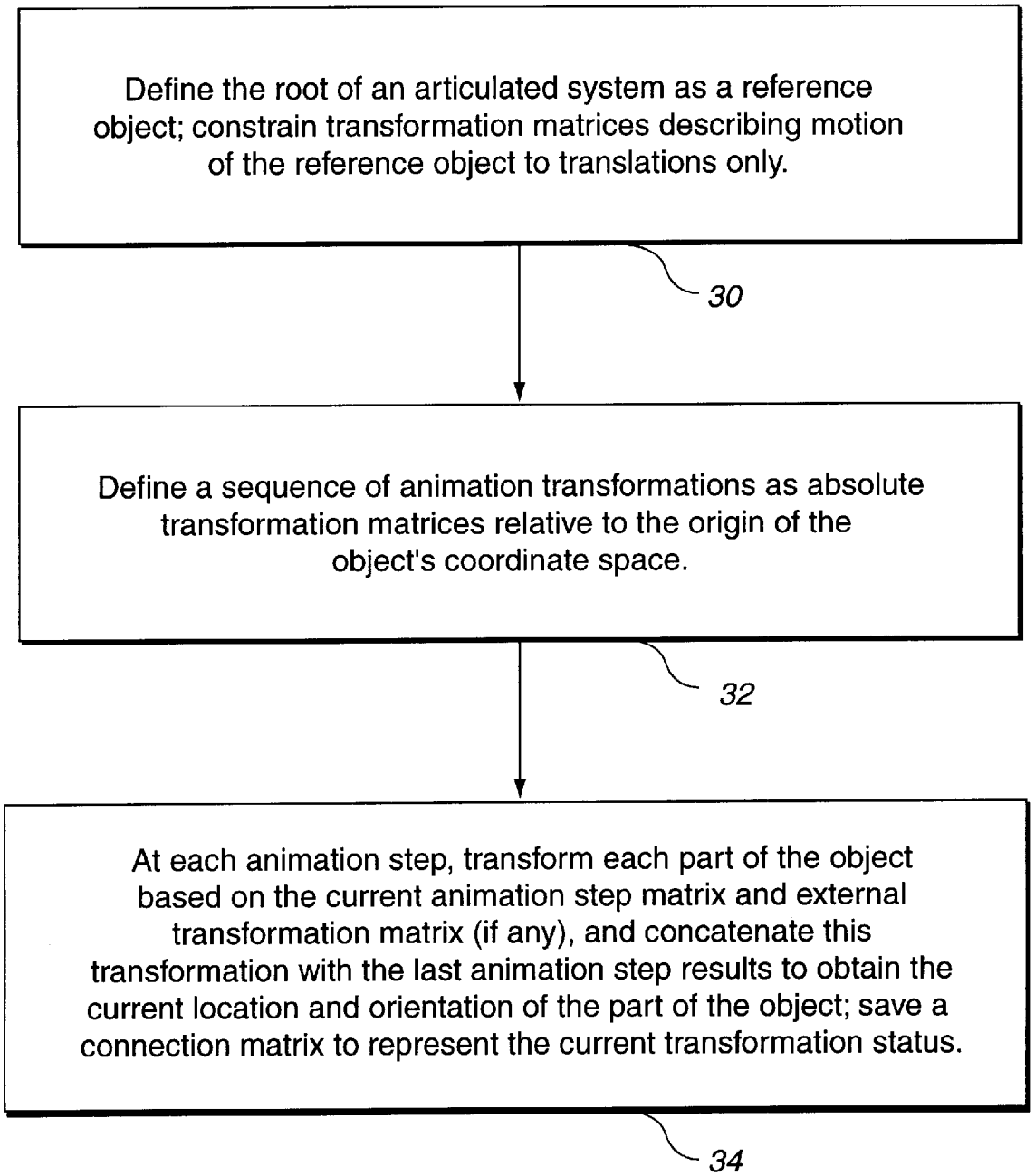
FIG. 3 schematically illustrates an example animation process in accordance with the present invention.

FIG. 3 shows the overall steps system 50 may perform to provide animation in accordance with a preferred example embodiment of the present invention. An initial step 30 defines the root of an articulated system (e.g., the FIG. 1A character) as a reference object (see FIG. 2), and constrains transformation matrices describing motion of the reference object to translations only. A second step 32 defines a sequence of transformation matrices $M_1 \ldots, M_{n-1}$ and $M_n$ representing an animation sequence of the object or an articulated portion of the object, where each matrix is defined with respect to the origin of the object's coordinate system origin. A further step 34 performed at each animation step transforms the object or articulated portion thereof, based on the transformation matrix for the current animation step and an external transformation matrix (if any).

At any arbitrary step k of the animation, such an external rotation matrix Me (e.g., reflecting real time interactive inputs from a human game player) may be inserted between steps k and k+1 so the sequence would be changed to reflect the influence of this external transformation. The external rotation matrix may be a 4×4 matrix defining rotation, translation and/or scaling in any of the x, y and z directions. The transformation(s) defined by the external matrix may be supplied in whole or in part in response to interactive realtime input from a human player via a user input device; or they may be supplied by other events (e.g., operation of a concurrently running program). Step 34 concatenates this transformation with the last animation step results to obtain the current location and orientation of the object. Step 34 also saves, at each step in the animation, a connection matrix to represent the current transformation status of the animated object for use in such concatenation—and for use in carrying forward to succeeding animation steps, the cumulative distilled history of the orientation, size and position of the object or articulated portion thereof.

Figure 3A:
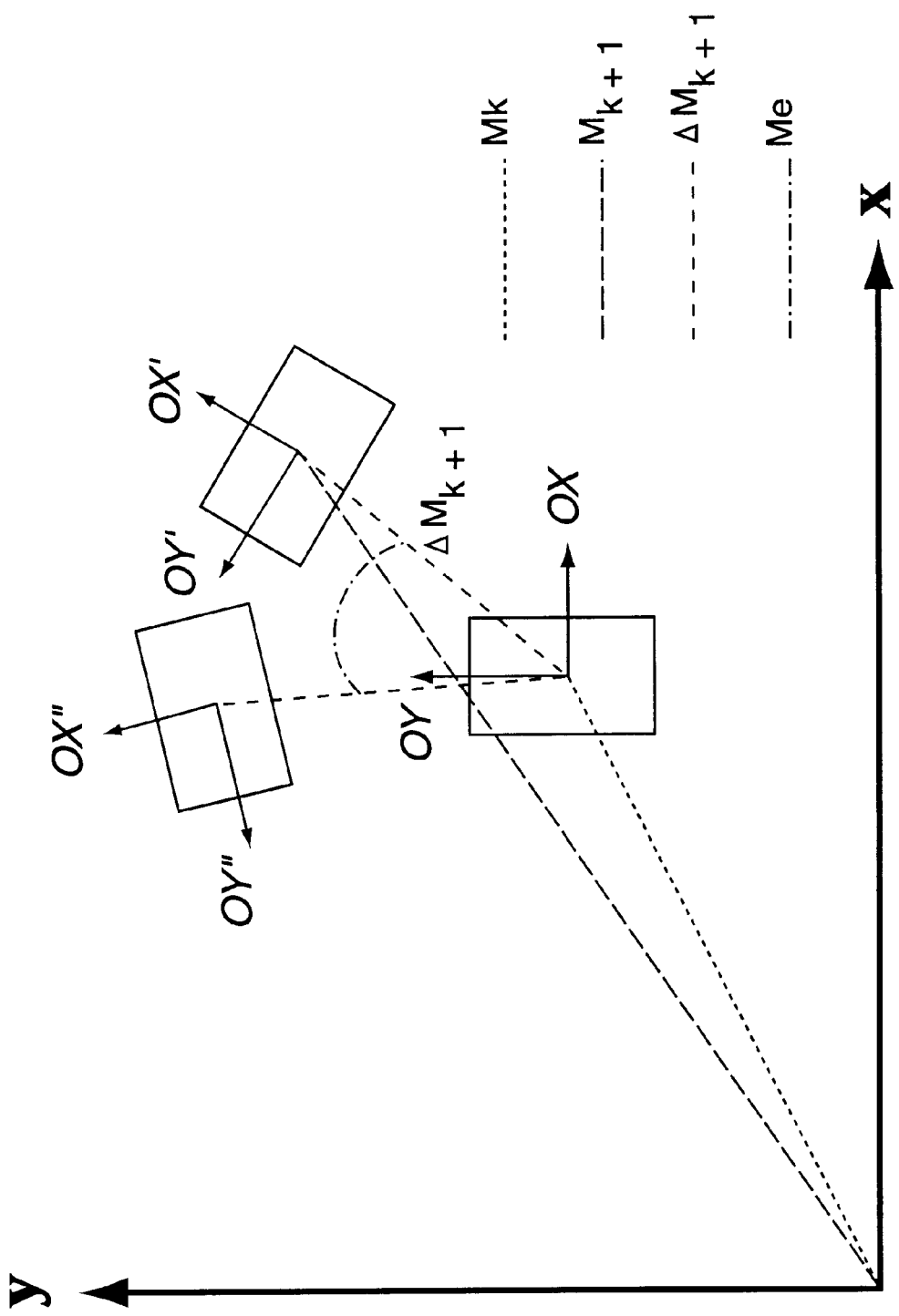
FIG. 3A schematically shows insertion of an external transformation between frames k and k+1 of an example animation sequence.

FIG. 3A graphically illustrates the transformation procedure of block 34. In the FIG. 3A graphical depiction:

<OX, OY> shows the position and orientation of an arbitrary object after a last animation step k;

<OX', OY'> shows the consequence after k+1 steps without the interference of the external rotation; and <OX", OY"> is the result with the external rotation inserted for the k+1 step.

FIG. 3A uses the following notations:

$M_k$ and $M_{k+1}$ are "absolute" transformation matrices of animation step k and k+1, which are defined with respect to the origin of the object's coordinate system;

$M_{k+1} = \Delta M_{k+1} M_k$ where $\Delta M_{k+1}$ is the k+1 step transformation matrix defined with respect to the previous transformation $M_k$; and $M_e$ is the external transformation matrix containing only rotations.

An intuitive method might be to push the external transformation matrix Me onto the stack after pushing the current transformation $M_k$, then adding the "relative" transformation matrix $M_{k+1}$ on top of that. This can be described by equation:

$$M''_{k+1} = \Delta M_{k+1} M_e' M_k$$

In practice, since all matrices are stored as the "absolute" transformations, it would be expensive to compute the relative transformation $\Delta M_{k+1}$ at runtime. Our approach instead uses the formula:

$$M''_{k+1} = M_{k+1}(-M_k^t) M_e' M_k' M_k$$

As a practical matter, this calculation can be performed by multiplying all of the various transformation matrices together to produce a resultant matrix that is then used to transform the object or articulated segment of the object.

Figure 4:
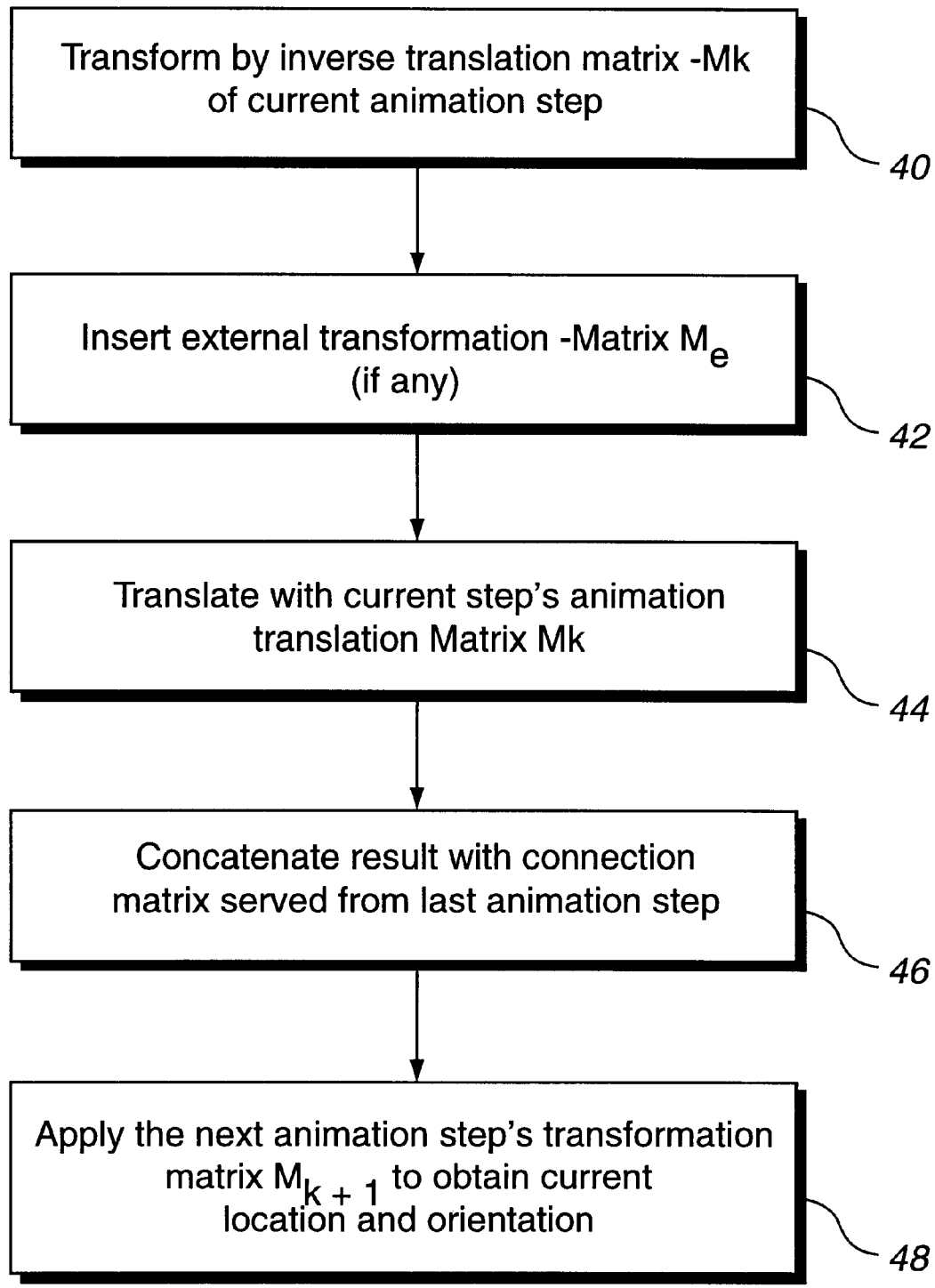
FIG. 4 shows an example transformation technique for inserting an external rotation between the k and k+1 steps of an animation sequence.

FIG. 4 shows a more detailed sequence of computer-performed steps that may be used to efficiently implement the FIG. 3A transformation, and FIGS. 4A–4D graphically illustrate these various steps. In each of FIGS. 4A–4D, <OX, OY > represents the object location and orientation before the transformation operation, while <OX', OY'> indicates that after the transformation. The first step is to invert the matrix $M_k$ for the current animation step, and to transform the object by the resulting inverse transformation (translation) of matrix $M_k$ for the current animation step (block 40) (see FIG. 4B). Next, an external transformation matrix $M_e$ is inserted if one is being used (block 42) (see FIG. 4C). This external transformation matrix commonly may include orientation transformations based on real-time user inputs such as operation of a joystick or the like, but may also or alternatively include other transformations such as translation and/or scaling.

The object is then re-translated with the current step's animation translation matrix $M_k$ (block 44) (see FIG. 4D)—thus "undoing" the FIG. 4B transformation by the inverse matrix. The result is concatenated with a connection matrix saved from the last animation step (block 46). The next animation step's transformation matrix $M_{k+1}$ is applied to the concatenated result (see FIG. 4A—which operation may be performed at the beginning or at the end of the concatenation process as desired) to obtain the object's location and orientation. It is easy to observe that the final result of the transformation shown in FIG. 4D coincides with the one shown in FIG. 3A.

Figure 5:
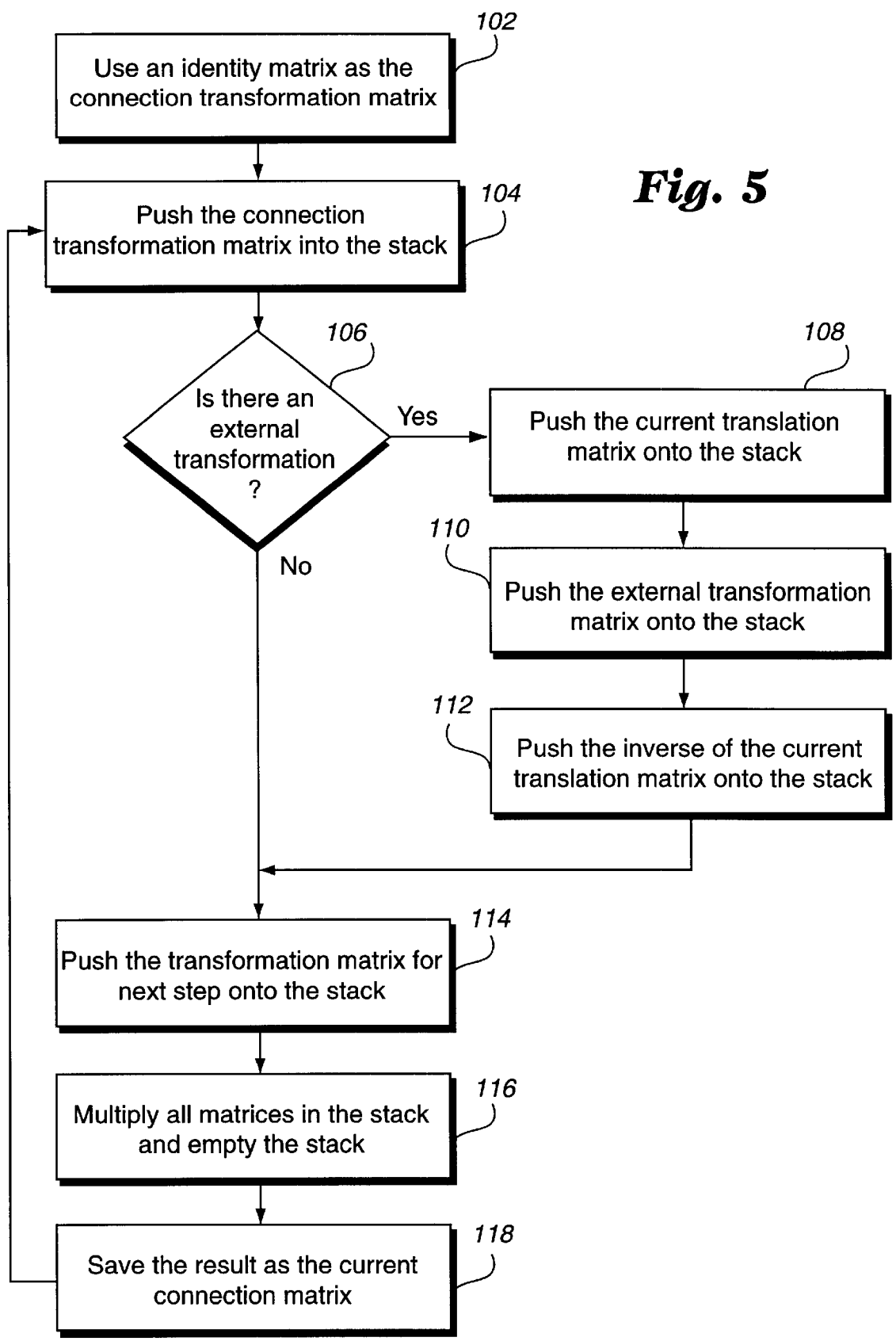
FIG. 5 is a flowchart of an example process performed in accordance with the invention.

FIG. 5 is a flowchart of an example process performed by the FIG. 1C system to animate character 11. In this example, system 50 initially uses an identity matrix as the connection transformation matrix (block 102), and pushes the connection transformation matrix onto a system transformation matrix stack (block 104). System 50 then determines whether there is an external transformation (e.g., supplied based on operation of controller(s) 54 by a human user) (block 106). If there is an external transformation ("yes" exit to decision block 106), system 50 pushes the current translation matrix onto the stack (block 108); then pushes external transformation matrix onto the stack (block 110); and finally, pushes the inverse of the current translation matrix onto the stack (block 112). Thus, the external transformation matrix is effectively concatenated with the current transformation matrix and the inverse of the current transformation matrix (see FIGS. 4B–4D).

Whether or not there is an external transformation, system 50 pushes the transformation matrix for the next animation step onto the stack (block 114), multiplies all matrices onto the stack to produce a current connection matrix (block 116), and saves the result (block 118). This resulting current connection matrix is used to generate display of the k+1th animation frame, and is also pushed onto the stack for use in the k+2d animation step (block 104). As will be understood by those skilled in the art, further conventional transformations (e.g., from object space into world space and/or camera space) may be applied before the animation-transformed object is displayed on display device 58.

Figure 6A:
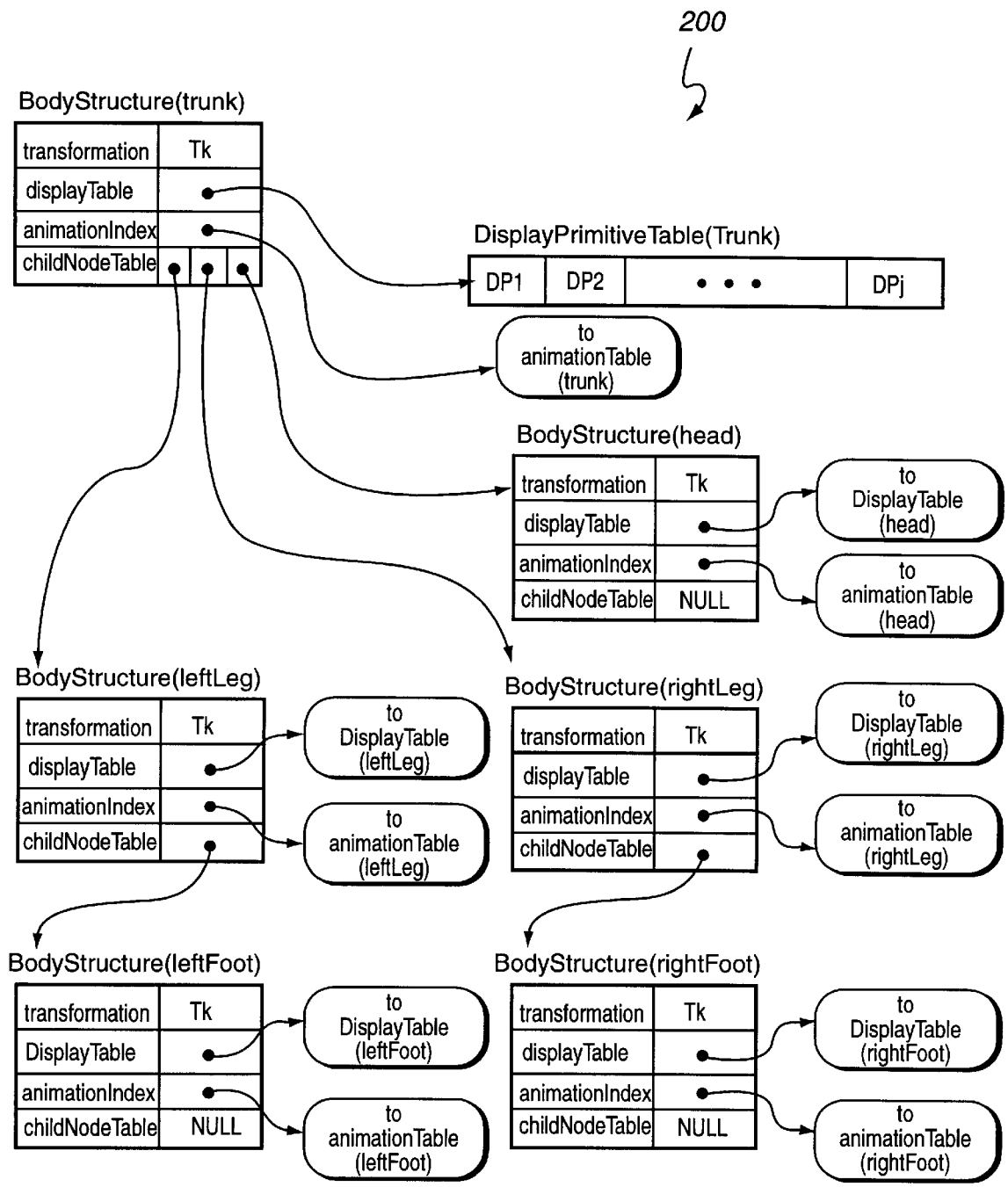
FIGS. 6A and 6B together show an example hierarchical object model provided by the present invention.
Figure 6B:
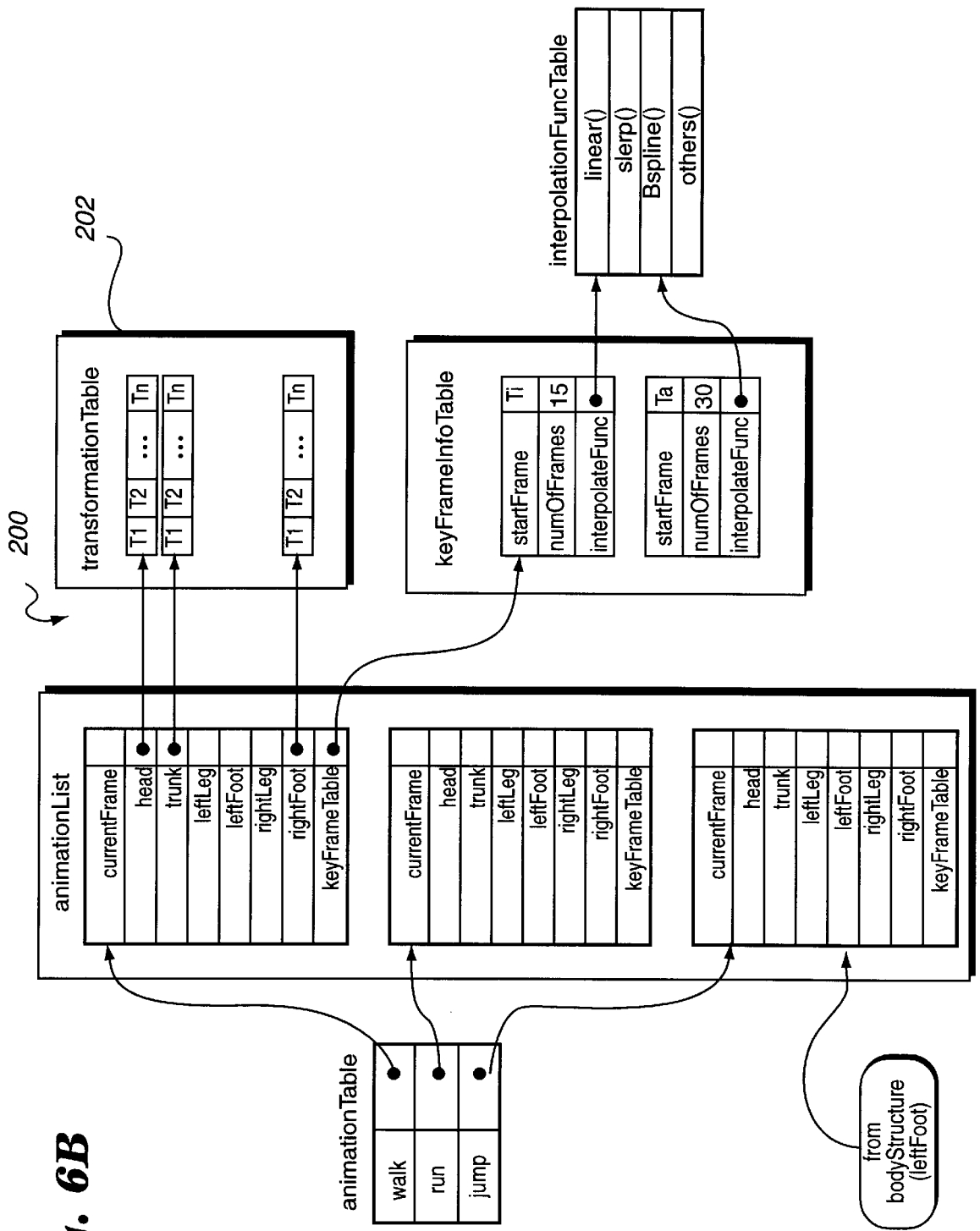

FIGS. 6A–6B show an example hierarchical data structure 200 that can be used to represent an arbitrary object 11 in accordance with the present invention. Data structure 200 is conventional except for its transformation table shown in FIG. 2B—which in this example stores sequences of transformation matrices of the type discussed above. In one example, each articulated joint of the 3D object will be separately defined in hierarchical data structure 200, and will have its own respective sequence of animation transformation matrices for each of N different animations (e.g., running, walking, doing handstands, falling, etc.) The matrices represented in transformation table 202 may be 4×4 matrices to allow translation, rotation and scaling factors to be represented in the same matrix. The transformation matrix sequences shown in FIG. 6B are used to perform the animation processes described herein.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the scope of the appended claims.

What is claimed is:

1. In a three-dimensional video game system including at least one interactive user control input, said video game system animating the movement of at least one three-dimensional display object by applying a precomputed, stored next frame transformation matrix to transform said object within three-dimensional space, a method of animating said three-dimensional display object based at least in part on said interactive user control input, said method comprising:

(a) determining an external transformation during interactive video game play in response to said interactive user control input;

(b) combining, using matrix multiplication, an external transformation matrix specifying said external transformation with said precomputed, stored next frame transformation matrix to produce a resultant transformation matrix;

(c) transforming, during said interactive video game play, said display object based at least in part on said resultant transformation matrix; and (d) displaying said transformed display object.

2. A method as in claim 1 further including constraining said next frame transformation matrix to specify translation only.

3. A method as in claim 2 wherein said display object is defined relative to an object coordinate system having an origin and includes at least one portion that is movable relative to a reference portion, said combining step (b) comprises generating a connection transformation matrix by concatenating the next frame transformation matrix with said external transformation matrix for said movable portion relative to said object coordinate system origin and performing a matrix multiplication calculation to generate a resultant transformation matrix to be used to transform said object within three-dimensional space.

4. A method as in claim 1 wherein sad display object is modeled as a hierarchical system of articulated parts, and said transforming step (c) is performed for at least some of said parts.

5. A method as in claim 1 wherein said display object is modeled as a articulated system having a root defined by a reference object, and said steps (a) and (b) are performed for said reference object.

6. A method as in claim 1 further comprising repeating at least step (b) for each of plural steps of said animation.

7. A method as in claim 1 wherein said step (b) further includes concatenating the external transformation with said next frame transformation matrix to produce a connection transformation matrix.

8. A method as in claim 1 further including concatenating the resultant transformation matrix of step (b) with a connection transformation matrix saved from a previous animation step.

9. A method as in claim 1 wherein said external transformation matrix is constrained to specify only rotations.

10. A method as in claim 1 wherein step (b) is performed by calculating $$M''_{k+1} = M_{k+1}(-M_k^t)M_e^r M_k^t M_k$$

where $M_k$ and $M_{k+1}$ are precomputed, prestored absolute transformation matrices of animation steps, k and k+1 defined with respect to the origin of the object's coordinate system; $M_{k+1} = M_{k+1} M_k$, where $M_{k+1}$ is the k+1 step transformation matrix defined with respect to a previous transformation matrix $M_k$; and $M_e$ is the external transformation matrix defined by step (a).

11. An interactive video game system for animating a 3-D object, said system including:

at least one interactive user control input defining an external transformation matrix;

a matrix multiplier that multiplies said external transformation matrix by a current precalculated, prestored transformation matrix to produce a resultant transformation matrix; and a display displaying said object based at least in part on said resultant transformation matrix.

12. A system as in claim 11 wherein said 3-D object is defined in an object modelling space having an origin, and said matrix multiplier also multiplies said resultant transformation matrix by a precomputed, prestored next animation frame transformation matrix constrained to specify translation only relative to said object modelling space origin.

13. A system as in claim 12 wherein said object includes at least one portion that is movable relative to a reference portion, and said system generates a connection transformation matrix by concatenating a precomputed, prestored next animation fine transformation matrix with said external transformation matrix for said movable portion relative to said object coordinate system origin.

14. A system as in claim 11 wherein said display object is modeled as a hierarchical system of articulated parts, and said multiplication is performed for at least some of said parts.

15. A system as in claim 11 wherein said object is modeled as an articulated system having a root defined by a reference object, and said matrix multiplication is performed for said reference object.

16. A system as in claim 11 wherein said matrix multiplier performs a matrix multiplication for each step of a multi-step animation.

17. A system as in claim 11 wherein said system continuously concatenates the external transformation with a next animation step to produce a connection transformation matrix.

18. A system as in claim 11 further including concatenating the resultant with a connection transformation matrix saved from a previous animation step.

19. A system as in claim 11 wherein said external transformation matrix contains only rotations.

20. A system as in claim 11 wherein the matrix multiplier performs the following matrix multiplication:

$$M''_{k+1} M_{k+1}(-M_k^t)M_e^r M_k^t M_k$$

where $M_k$ and $M_{k+1}$ are precomputed, prestored absolute transformation matrices of animation steps, k and k+1 defined with respect to the origin of the object's coordinate system; $M_{k+1} = \Delta M_{k+1} M_k$, where $\Delta M_{k+1}$ is the k+1 step transformation matrix defined with respect to a previous transformation matrix $M_k$; and $M_e$ is the external transformation matrix defined by said external transformation matrix.

21. A method of authoring a three-dimensional animation sequence comprising:

(a) defining a three-dimensional object in terms of a reference object within a three-dimensional object coordinate system having an origin; and (b) at authoring time, predefining at least one sequence of precomputed, prestored animation transformations relating to said object, each of said animation transformations in said sequence being constrained to define a translation only, relative to said object coordinate system origin;

(c) representing said three-dimensional object by a hierarchical data structure defining articulated segments of said object and said sequence of animation transformations; and developing and/or supplying a runtime calculating routine for calculating $$M''_{k+1} = M_{k+1}(-M_k^t) M_e^r M_k^t M_t$$

where $M_k$ and $M_{k+1}$ are absolute transformations of precomputed, prestored animation steps, k and k+1 defined with respect to the origin of the object's coordinate system; $M_{k+1} = \Delta M_{k+1} M_k$, where $\Delta M_{k+1}$ is the k+1 step transformation defined with respect to a previous transformation $M_k$; and $M_e$ is the external transformation defined by at least one external transformation determined at run time based on interactive user input, said transformation matrices being combined at run time using matrix multiplication.

22. A method as in claim 21 wherein said object is modeled as a hierarchical system of articulated segments, and said step (b) defines an animation of at least one of said segments relative to said reference object.

23. A method as in claim 21 wherein said object is modeled as an articulated system having a root defined by said reference object.

24. A method as in claim 21 wherein said sequence of animation transformations are adapted to be continuously concatenated with an external transformation based on real-time user input.

25. A method as in claim 24 wherein said external transformation contains only rotations.

26. A method of animating an object comprising:

(a) transforming the object in 3D space by applying the inverse translation of a precomputed, precomputed animation translation transformation;

(b) using matrix multiplication, inserting a further transformation based at least in part on real time input;

(c) further transforming the object by the further transformation, the precomputed animation's translation, and a connection transformation matrix saved from a previous animation operation to provide a result; and (d) specifying the object's location and orientation for display based at least in part on the result from said transforming step (c).

* * * * *